United States Patent
Iida (10) Patent No.: US 7,502,242 B2
(45) Date of Patent: Mar. 10, 2009

(54) BIDIRECTIONAL INSULATED DC/AC INVERTER

(75) Inventor: Takahide Iida, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/580,630

(22) Filed: Oct. 12, 2006

(65) Prior Publication Data

US 2007/0086216 A1    Apr. 19, 2007

(30) Foreign Application Priority Data

Oct. 19, 2005    (JP)    ............... 2005-304739

(51) Int. Cl.
*H02M 3/24*    (2006.01)
(52) U.S. Cl. .................................... 363/95
(58) Field of Classification Search ............... 363/16, 363/34, 78, 79, 95, 97
See application file for complete search history.

(56) References Cited

U.S. PATENT DOCUMENTS

| 6,330,170 B1 * | 12/2001 | Wang et al. | 363/37 |
| 6,364,673 B1 * | 4/2002 | Lee | 439/139 |
| 6,600,670 B2 * | 7/2003 | Morita et al. | 363/89 |

FOREIGN PATENT DOCUMENTS

| JP | 2000-224780 | 8/2000 |
| JP | 2001-037226 | 2/2001 |
| JP | 2002-010517 | 1/2002 |

* cited by examiner

*Primary Examiner*—Adolf Berhane
(74) *Attorney, Agent, or Firm*—Morgan & Finnegan, LLP (57) ABSTRACT

A plug and an outlet are electrically and directly connected, and when a control circuit determines that AC power is input from a power source to a bidirectional insulated DC/AC inverter by voltage V1 detected in a voltage detection circuit, driving of each bridge circuits is inhibited so as not to output AC power outward from the bidirectional insulated DC/AC inverter.

7 Claims, 5 Drawing Sheets

FIG. 1

PRIOR ART

BIDIRECTIONAL INSULATED DC/AC INVERTER

BACKGROUND OF THE INVENTION

1. Field of the Invention

The present invention relates to a bidirectional insulated DC/AC inverter, and specifically relates to a switching control between a battery charge operation and an AC power output operation.

2. Description of the Related Art

Figure 1:
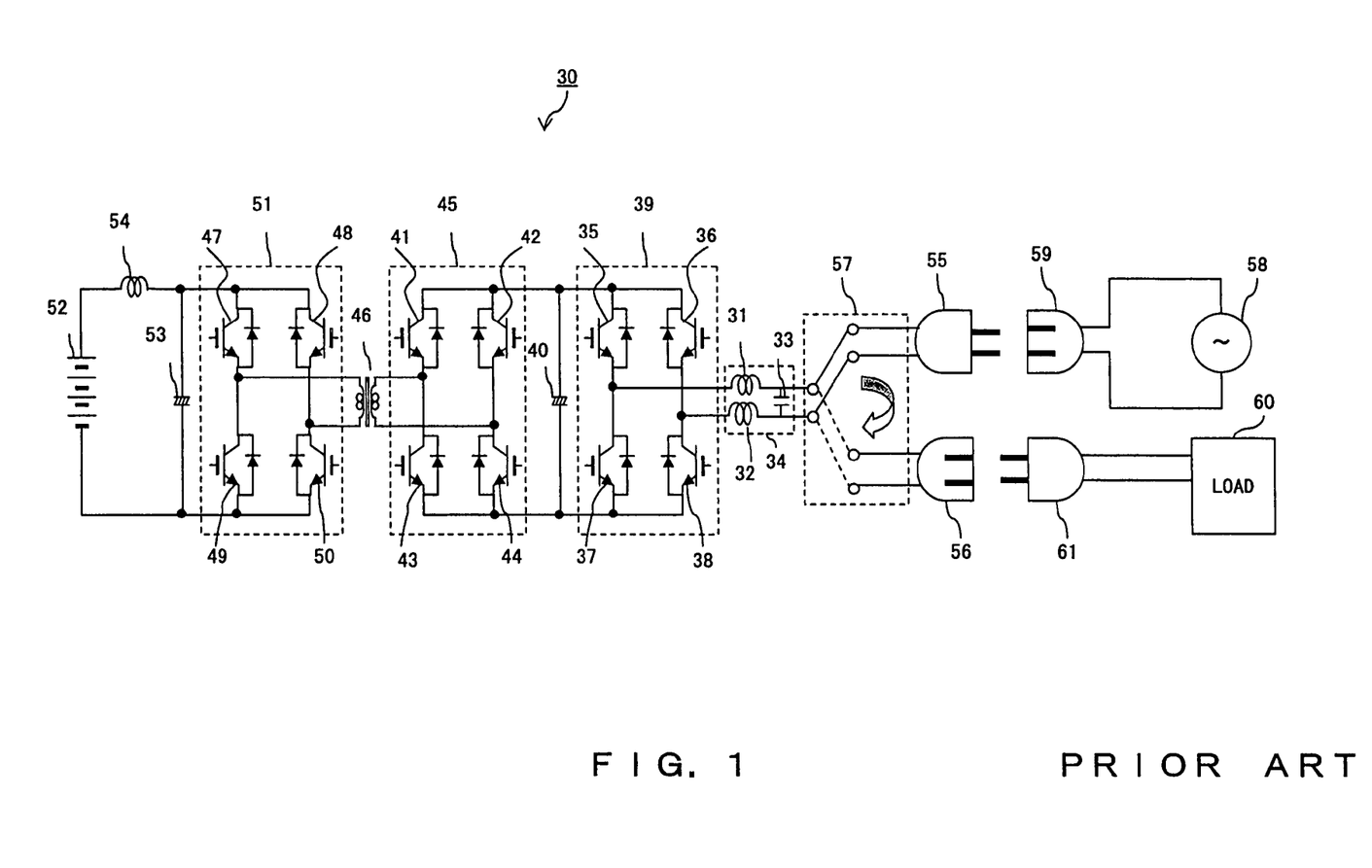
FIG. 1 is a diagram illustrating an existing bidirectional insulated DC/AC inverter.

FIG. 1 is a diagram showing an existing bidirectional insulated DC/AC inverter.

A bidirectional insulated DC/AC inverter 30 shown in FIG. 1 comprises a filter 34 comprising coils 31 and 32 and a capacitor 33, a bridge circuit 39 comprising four switching elements 35-38 and connected to the filter 34, a bridge circuit 45 comprising four switching elements 41-44 and connected to the bridge circuit 39 via a capacitor 40, a bridge circuit 51 comprising four switching elements 47-50 and connected to the bridge circuit 45 via a transformer 46, a capacitor 53 and a coil 54 provided between the bridge circuit 51 and a battery 52, a plug 55, an outlet 56, and a relay 57 electrically connecting the bridge circuit 39 and the plug 55 via the filter 34 while charging the battery 52 and electrically connecting the bridge circuit 39 and the outlet 56 via the filter 34 while outputting AC power of the bidirectional insulated DC/AC inverter 30. It should be noted that the switching elements 35-38, the switching elements 41-44, and the switching elements 47-50 are, for example, IGBT (Insulated Gate Bipolar Transistors), and a diode is connected in parallel with each of the switching elements. It is assumed that the plug 55 is connected to an outlet 59, comprised in an external power source 58 while charging the battery 52. The outlet 56 is connected to a plug 61, comprised in an external load 60 while outputting AC power from the bidirectional insulated DC/AC inverter 30.

The bidirectional insulated DC/AC inverter 30, when charging the battery 52, turns the switching elements 41 and 44 and the switching elements 42 and 43 of the bridge circuit 45 on and off in an alternate manner. In other words, when the battery 52 is charged, the AC power input to the bridge circuit 39 from the power source 58 via the outlet 59, the plug 55, the relay 57, and the filter 34 is converted into DC power after being rectified by the diodes connected in parallel with the switching elements 35-38 of the bridge circuit 39 and being made smoothed by the capacitor 40. Next, the DC power is converted into AC power by the bridge circuit 45 and afterwards output to the bridge circuit 51 via the transformer 46. The AC power is rectified by the diodes connected in parallel with the switching elements 47-50 of the bridge circuit 51, is made smoothed by the capacitor 53, and afterwards is converted into DC power. The DC power is provided to the battery 52 via the coil 54.

The above bidirectional insulated DC/AC inverter 30, when supplying AC power to the load 60, turns the switching elements 47 and 50 and the switching elements 48 and 49 of the bridge circuit 51 on and off in an alternate manner, as well as turning the switching elements 35 and 38 and the switching elements 36 and 37 of the bridge circuit 39 on and off in an alternate manner. In other words, when AC power is supplied from the bidirectional insulated DC/AC inverter 30 to the load 60, the DC power obtained from the battery 52 is converted into AC power by the bridge circuit 51, and is output to the bridge circuit 45 via the transformer 46. Next, the AC power is rectified by the diodes connected in parallel with the switching elements 41-44 of the bridge circuit 45, is made smoothed by the capacitor 40, and is converted into DC power. The DC power is converted into AC power by the bridge circuit 39 and is provided to the load 60 via the filter 34, the relay 57, the outlet 56, and the plug 61.

As described above, the bidirectional insulated DC/AC inverter 30 drives the bridge circuit 45 while charging the battery 52 and drives the bridge circuit 39 and the bridge circuit 51 while outputting AC power (for an example, please see Patent Document 1).

Patent Document 1:

Japanese Patent Application Publication No. 2001-37226

However, since the relay 57 of the bidirectional insulated DC/AC inverter 30 is a mechanical switch, it is likely to cause operation error at the end of the product-life cycle owing to repeated opening and closing. Thus, there is a risk of malfunction of the bidirectional insulated DC/AC inverter 30 caused by operation error in the relay 57, such as the bridge circuit 39 and the plug 55 being connected while AC power output of the bidirectional insulated DC/AC inverter 30.

SUMMARY OF THE INVENTION

It is an object of the present invention to provide a bidirectional insulated DC/AC inverter, which prevents malfunction caused by an operation error of a mechanical switch.

In order to solve the above problem, the present invention employs the following configuration:

A bidirectional insulated DC/AC inverter of the present invention comprises:

first power conversion means, comprising an AC input/output terminal and a DC input/output terminal (for receiving AC power from the AC power input/output terminal and outputting DC power to the DC input/output terminal in power conversion from AC to DC and for receiving DC power from the DC power input/output terminal and outputting AC power to the AC input/output terminal in power conversion from DC to AC);

second power conversion means, comprising an AC input/output terminal and a DC input/output terminal connected to the DC input/output terminal of the first power conversion means (for receiving AC power from the AC power input/output terminal and outputting DC power to the DC input/output terminal in power conversion from AC to DC and for receiving DC power from the DC power input/output terminal and outputting AC power to the AC input/output terminal in power conversion from DC to AC);

third power conversion means, comprising an AC input/output terminal and a DC input/output terminal connected to a battery (for receiving AC power from the AC power input/output terminal and outputting DC power to the DC input/output terminal in power conversion from AC to DC and for receiving DC power from the DC power input/output terminal and outputting AC power to the AC input/output terminal in power conversion from DC to AC);

a transformer, connected to the AC input/output terminal of the second power conversion means and the AC input/output terminal of the third power conversion means;

a control means for controlling operations of each of the first through the third power conversion means;

a plug for electrically connecting an external power source and the AC input/output terminal of the first power conversion means;

an outlet, connected to the plug electrically and directly, for electrically connecting an external load and the AC input/output terminal of the first power conversion means;

a detection means for detecting first voltage (which is the voltage of the AC input/output terminal of the first power conversion means) or second voltage (which is the voltage of the DC input/output terminal of the first power conversion means), and control means, based on the voltage detected by the detection means, for determining whether or not AC power is input from the external power source to the first power conversion means and for inhibiting (at least) a power conversion operation from DC to AC of the third power conversion means, when determining that AC power is input from the external power source to the first power conversion means.

Using the above configuration, it is possible to prevent the AC power input (from the power source to the bidirectional insulated DC/AC inverter) and the AC power output (from the bidirectional insulated DC/AC inverter) from overlapping with each other, even if the plug and the outlet are electrically and directly connected. Thus, using a mechanical switch in order to switch the connection between the first power converter means and the plug or the connection between the first power converter means and the outlet becomes unnecessary. By eliminating the mechanical switch (which carries a risk of limiting the product life-cycle) from the bidirectional insulated DC/AC inverter, operational errors caused by malfunction of the bidirectional insulated DC/AS inverter can be prevented.

The control means may have a configuration, comprising an AC power output instruction input means, for determining, when receiving AC power output instruction of the bidirectional insulated DC/AC inverter whether or not AC power is input from the power source to the bidirectional insulated DC/AC inverter based on the voltage detected by the detection means.

The control means may have a configuration for determining whether AC power is input from the power source to the bidirectional insulated DC/AC inverter and inhibiting at least the power conversion operation from DC to AC of the third power conversion means, when at least the power conversion operation from DC to AC of the third power conversion means is stopped, if the first voltage has positive and negative fluctuation at a certain frequency and the amplitude value of the fluctuating voltage is at a prescribed value or higher.

The control means may have a configuration for determining whether AC power is input from the power source to the bidirectional insulated DC/AC inverter, and inhibiting at least the power conversion operation from DC to AC of the third power conversion means, when at least the power conversion operation from DC to AC of the third power conversion means is stopped, if the second voltage is constantly at a prescribed value or higher.

The second voltage is voltage applied to a capacitor, which is provided between the first power conversion means and the second power conversion means and to which a discharging resistance is connected. The control means may have a configuration for determining that AC power is input from the power source to the bidirectional insulated DC/AC inverter and inhibiting at least the power conversion operation from DC to AC of the third power conversion means when the second voltage does not drop to a prescribed voltage after a certain time period from the stop of the AC power output operation of the bidirectional insulated DC/AC inverter.

The control means may have a configuration for determining that AC power is input from the power source to the bidirectional insulated DC/AC inverter and inhibiting at least the power conversion operation from DC to AC of the third power conversion means when outputting the AC power of the bidirectional insulated DC/AC inverter if a phase of a waveform of the first voltage is different from a phase of a predetermined voltage waveform.

The control means may have a configuration for changing the phase of the predetermined voltage waveform, when the phase of the waveform of the first voltage is not different from the phase of the predetermined voltage waveform; for determining that AC power is input from the power source to the bidirectional insulated DC/AC inverter; and for inhibiting at least the power conversion operation from DC to AC of the third power conversion means, when the changed phase of the prescribed voltage waveform is different from the phase of the waveform of the first voltage.

According to the present invention, it is possible to prevent malfunction caused by an operation error of a mechanical switch in a bidirectional insulated DC/AC inverter.

DESCRIPTION OF THE PREFERRED EMBODIMENTS

In the following description, embodiments of the present invention are set forth with reference to the drawings.

Figure 2A:
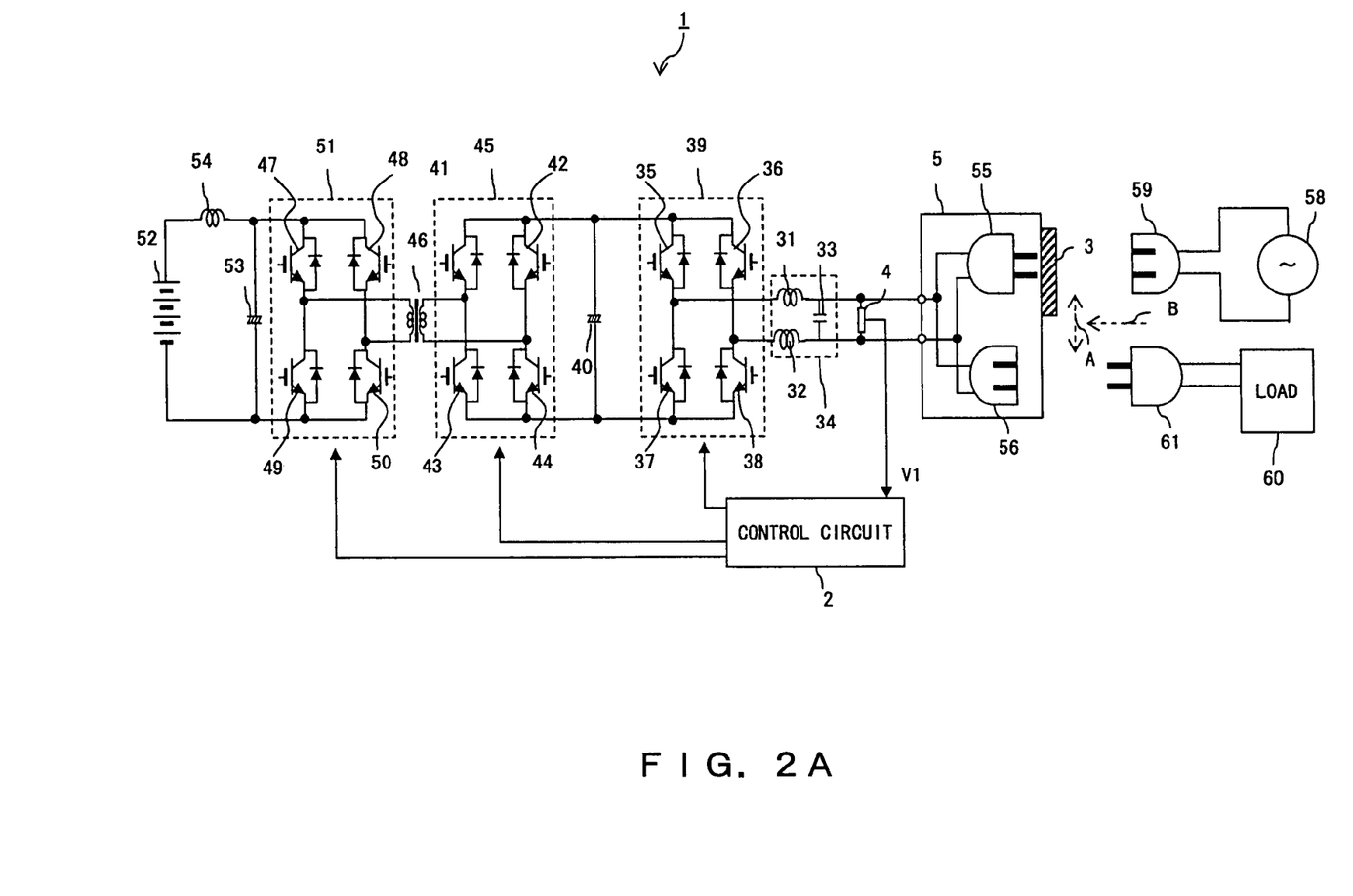
FIG. 2A is a diagram illustrating the bidirectional insulated DC/AC inverter of the embodiments of the present invention.

FIG. 2A is a diagram showing the bidirectional insulated DC/AC inverter of the embodiments of the present invention. Note that the same numerical references are assigned to the same components as those in the configuration shown in FIG. 1.

A bidirectional insulated DC/AC inverter 1 as shown in FIG. 2A comprises a filter 34, a bridge circuit 39, a capacitor 40, a bridge circuit 45, a transformer 46, a bridge circuit 51, a capacitor 53, a coil 54, a plug 55, an outlet 56, a control circuit 2 (control means) driving switching elements 41-44 while charging a battery 52, as well as driving switching elements 35-38 and switching elements 47-50 while outputting AC power of the bidirectional insulated DC/AC inverter 1, a movable shutter 3 slidable in the direction of an arrow A, covering either the plug 55 or the outlet 56, and a voltage detection circuit 4 (detection means) detecting input/output voltage V1 (first voltage) in the plug 55/outlet 56 side of the bridge circuit 39. Note that the plug 55 and the outlet 56 are provided in a case 5. Besides the plug 55 and the outlet 56, other circuits such as the filter 34 and the bridge circuit 39 may be provided in the case 5.

The first power conversion means described in the claims is established by the bridge circuit 39 and the capacitor 40 while charging the battery 52, and by the bridge circuit 39 while outputting AC power of the bidirectional insulated DC/AC inverter 1. The second power conversion means described in the claims is established by the bridge circuit 45 while charging the battery 52, and by the bridge circuit 45 and the capacitor 40 while outputting the AC power of the bidirectional insulated DC/AC inverter 1. The third power conversion means described in claims is established by the bridge circuit 51 and the capacitor 53 while charging the battery 52, and by the bridge circuit 51 while outputting the AC power of the bidirectional insulated DC/AC inverter 1. The switching elements 35-38, the switching elements 41-44, and the switching elements 47-50 may be established by a MOSFET (Metal Oxide Semiconductor Field Effect Transistor) comprising a body diode. The bridge circuit 39, the bridge circuit 45, or the bridge circuit 51 may be established by a half-bridge type bridge circuit comprising two switching elements.

Figure 2B:
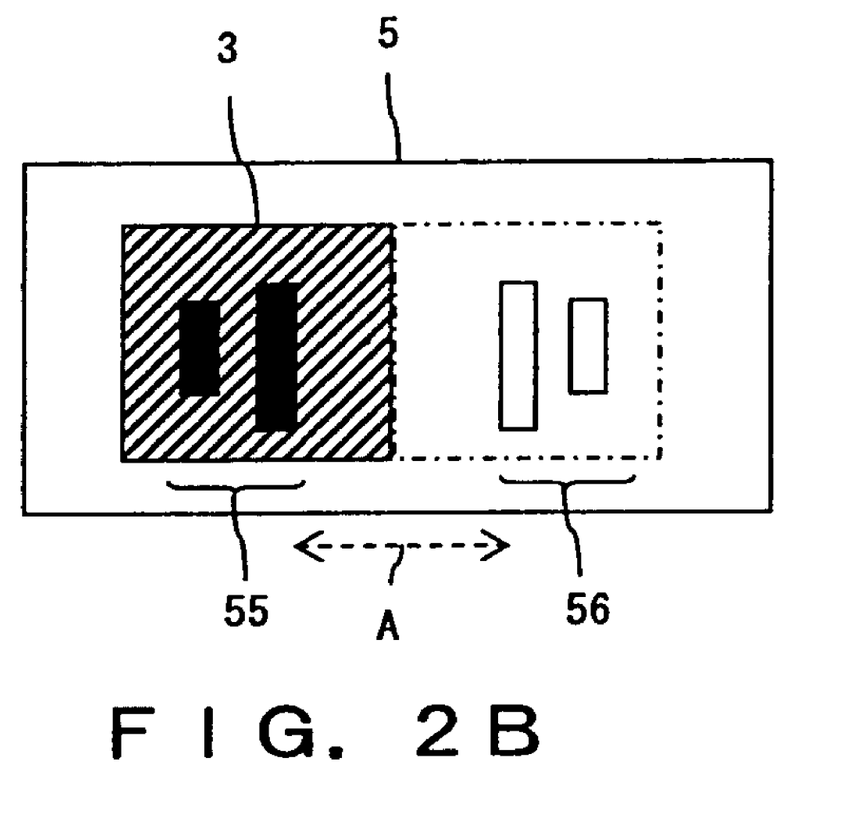
FIG. 2B is a diagram of the case shown in FIG. 2A viewed from a direction of an arrow B.

FIG. 2B is a diagram of the case 5 shown in FIG. 2A viewed from the direction of an arrow B.

As shown in FIG. 2B, when the movable shutter 3 is slid by a user and the plug 55 is covered, the plug 55 and the outlet 59 can no longer be connected, although the outlet 56 and the plug 61 can be connected. Meanwhile, when the movable shutter 3 is slid by a user and the outlet 56 is covered, the outlet 56 and the plug 61 can no longer be connected, although the plug 55 and the outlet 59 can be connected.

For example, when an AC power output instruction is given to the control circuit 2 by a user after the plug 55 is covered by the user and the outlet 56 and the plug 61 are connected, the control circuit 2 converts DC power obtained from the battery 52 into AC power, and drives the bridge circuit 39 and the bridge circuit 51 in order to provide the AC power to the load 61. When a charging instruction is given to the control circuit 2 from the user after the outlet 56 is covered by the user and the plug 55 and the outlet 59 are connected, the control circuit 2 converts AC power obtained from the power source 58 into DC power, and drives the bridge circuit 45 in order to provide DC power to the battery 52.

Features of the bidirectional insulated DC/AC inverter 1 of the present embodiment are such that the plug 55 and the outlet 56 are directly and electrically connected without being mediated by the relays., among other devices, When outputting AC power from the bidirectional insulated DC/AC inverter 1, if the voltage V1 detected by the voltage detection circuit 4 has positive and negative fluctuations at a certain frequency and the amplitude value of the fluctuating voltage V1 is at a prescribed value or higher, the control circuit 2 determines that AC power is input to the bidirectional insulated DC/AC inverter 1 from outside and inhibits driving of the bridge circuit 39 and the bridge circuit 51 so that AC power is not output from the bidirectional insulated DC/AC inverter 1. Note that when the control circuit 2 determines that AC power is input from outside to the bidirectional insulated DC/AC inverter 1 (even without the charging instruction from the user), the bridge circuit 45 may be driven in order to charge the battery 52. Furthermore, when the control circuit 2, determines that AC power is not input from the outside to the bidirectional insulated DC/AC inverter 1, even without the AC power output instruction from the user, the bridge circuit 39 and the bridge circuit 51 may be driven in order to output AC power from the bidirectional insulated DC/AC inverter 1.

Figure 3:
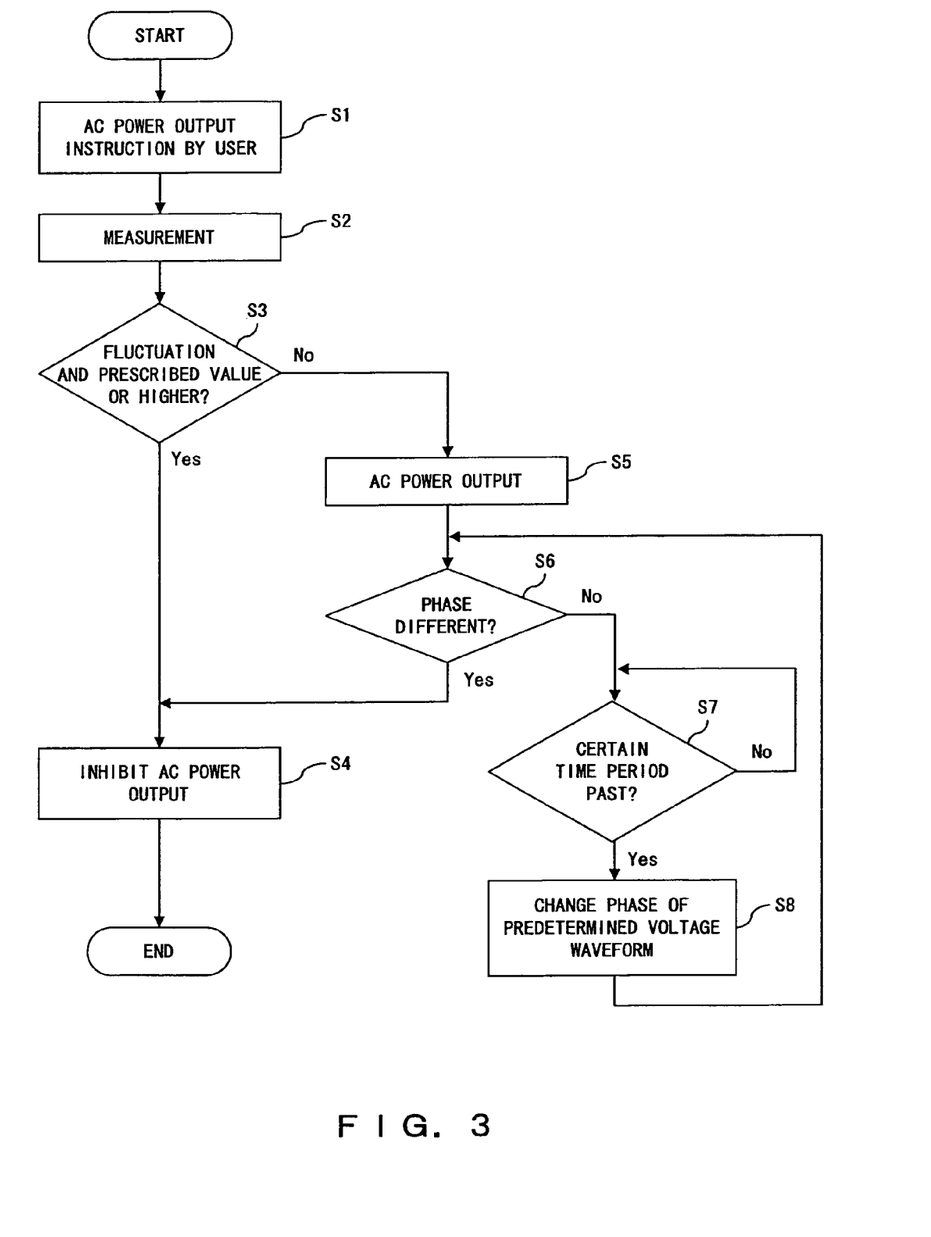
FIG. 3 is a flowchart illustrating an example of the operation of the control circuit when outputting AC power outward from the bidirectional insulated DC/AC inverter.

FIG. 3 is a flowchart illustrating an example of the operation of the control circuit 2 when outputting AC power from the bidirectional insulated DC/AC inverter 1. Note that the bridge circuit 39, the bridge circuit 45, and the bridge circuit 51 are stopped at the beginning.

In step S1, first the control circuit 2 receives an output instruction of AC power from the bidirectional insulated DC/AC inverter 1 from a user.

Next, in step S2, the control circuit 2 measures the voltage V1 using the voltage detection circuit 4.

Following that, in step S3, the control circuit 2 determines whether or not the voltage V1 measured in step S2 has positive and negative fluctuation at a certain frequency, and the amplitude value of the fluctuating voltage V1 is at a prescribed value or higher.

When the voltage V1 measured in step S2 has positive and negative fluctuation at a certain frequency, and the amplitude value of the fluctuating voltage V1 is at a prescribed value or higher (step S3, Yes), the control circuit 2, in step S4, determines that AC power is input from the power source 58 to the bidirectional insulated DC/AC inverter 1 and inhibits driving the bridge circuit 39 and the bridge circuit 51 so as not to output the AC power from the bidirectional insulated DC/AC inverter 1. Note that in such a case, driving of the bridge circuit 51 alone may be inhibited so as not to output AC power from the bidirectional insulated DC/AC inverter 1. In this case, also, when a charging instruction for the battery 52 is given from the user to the control circuit 2, the control circuit 2 may drive the bridge circuit 45 so that the battery 52 is charged.

Additionally, if the voltage V1 measured in step S2 does not have positive and negative fluctuation at a certain frequency (step S3, No), the control circuit 2, in step S5, determines that AC power has not been input from the power source 58 to the bidirectional insulated DC/AC inverter 1, and drives the bridge circuit 39 and the bridge circuit 51 in order to output AC power from the bidirectional insulated DC/AC inverter 1.

In step S6, next, the control circuit 2 measures voltage V1 using the voltage detection circuit 4 when outputting AC power of the bidirectional insulated DC/AC inverter 1 and determines whether or not the waveform phase of the measured voltage V1 is different from the phase of a predetermined voltage waveform by a prescribed amount or larger. Note that the predetermined voltage waveform is a voltage waveform estimated to be output from the bridge circuit 39 when the bridge circuit 39 and the bridge circuit 51 are driven in order to output AC power from the bidirectional insulated DC/AC inverter 1, in the case that the plug 55 and the outlet 59 are not connected.

When it is determined that the phase of the waveform of the voltage V1 measured in step S6 is different from the phase of a predetermined voltage waveform by a prescribed amount or larger (step S6, Yes), in step S4, then, the control circuit 2 determines that AC power is input from the power source 58 to the bidirectional insulated DC/AC inverter 1, and inhibits driving of the bridge circuit 39 and the bridge circuit 51 so that AC power is not output from the bidirectional insulated DC/AC inverter 1.

Furthermore, when it is determined that the phase of the waveform of the voltage V1 measured in step S6 is not different from the phase of a predetermined voltage waveform by a prescribed amount or larger (step S6, No), the control circuit 2, in step S7, determines whether or not a prescribed time period has passed.

When it is determined that a prescribed time period has passed (step S7, Yes), the control circuit 2, in step S8, changes the phase of the predetermined voltage waveform, and the process returning to step S6, determines whether or not the changed phase of the predetermined voltage waveform and the phase of the waveform of the voltage V1 re-measured are different by a prescribed amount or larger.

Afterwards, the output operations of AC power from the bidirectional insulated DC/AC inverter 1 are continued by repeating steps S6-S8 until it is determined that the phase of the waveform of the voltage V1 (measured in step S6) is different from the phase of a predetermined voltage waveform by a prescribed amount or larger or until an instruction to stop the AC power operation of the bidirectional insulated DC/AC inverter 1 is given to the control circuit 2 by a user.

As described above, the bidirectional insulated DC/AC inverter 1, when determining whether AC power is input from the power source 58 to the bidirectional insulated DC/AC inverter 1, inhibits driving of (at least) the bridge circuit 51 and stops the AC power output operation of the bidirectional insulated DC/AC inverter 1. Therefore, it is possible to prevent the AC power input from the power source 58 to the bidirectional insulated DC/AC inverter 1 and the AC power output from the bidirectional insulated DC/AC inverter 1 from overlapping with each other, even if the plug 55 and the outlet 56 are electrically and directly connected. By so doing, the bidirectional insulated DC/AC inverter 1 can be configured without using relays (for example), which carry a risk of expiring during the product-life cycle, and consequently, malfunction of the bidirectional insulated DC/AC inverter 1 caused by operation errors of a mechanical switch can be prevented.

Because the bidirectional insulated DC/AC inverter 1 is provided with the transformer 46 between the bridge circuit 45 and the bridge circuit 51, even if AC power is input from the power source 58 to the bidirectional insulated DC/AC inverter 1, the current flowing from the bridge circuit 39 to the bridge circuit 45 can be stopped by the transformer 46 so as to prevent the current flowing into the bridge circuit 51. By doing so, even if AC power is input from the power source 58 to the bidirectional insulated DC/AC inverter 1, the battery 52 is not charged unless the bridge circuit 45 is driven, and thus it is possible to prevent the battery 52 from being charged automatically.

It should be noted that in this embodiment, the determination of whether or not AC power is input from the power source 58 to the bidirectional insulated DC/AC inverter 1 is determined based on the input/output voltage V1 in the plug 55/outlet 56 side of the bridge circuit 39. However, the determination of whether or not the AC power is input from the power source 58 to the bidirectional insulated DC/AC inverter 1 may be determined based on the input/output voltage in the bridge circuit 45 side of the bridge circuit 39.

Figure 2C:
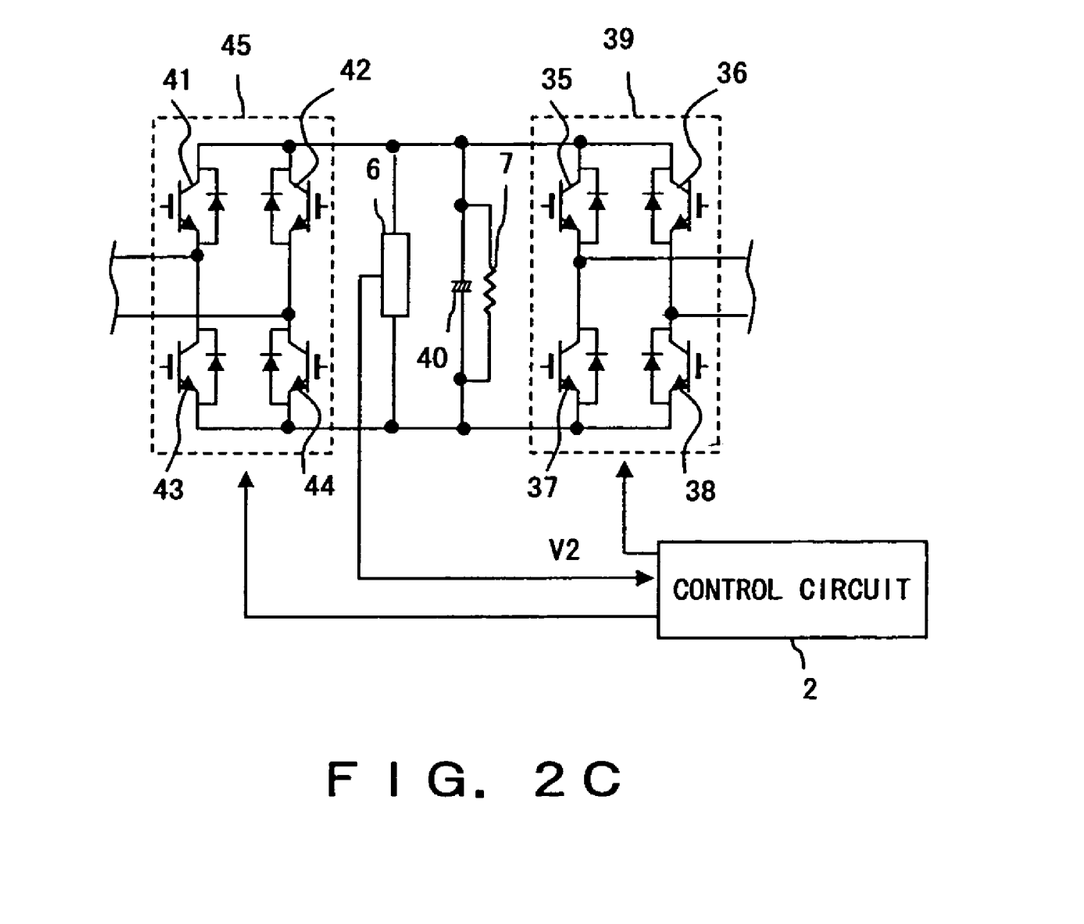
FIG. 2C is a diagram illustrating the bidirectional insulated DC/AC inverter of another embodiment of the present invention.

There is another possible configuration, for example, as shown in FIG. 2C, by providing the bidirectional insulated DC/AC inverter 1 with a voltage detection circuit 6 (detection means) for detecting input/output voltage V2 (second voltage) in the bridge circuit 45 side of the bridge circuit 39. When at least the bridge circuit 51 is stopped, if the voltage V2 detected by the voltage detection circuit 6 is constantly at a prescribed value or higher, the control circuit 2 determines that AC power is input from the power source 58 to the bidirectional insulated DC/AC inverter 1, inhibits the driving of at least the bridge circuit 51 so as not to output AC power from the bidirectional insulated DC/AC inverter 1, and allows the driving of the bridge circuit 45 when charging the battery 52. Note that the word "constantly" is used meaning that this procedure continues for a for a specified time period.

In this other possible configuration, as shown in FIG. 2C, for example, a discharging resistance 7 is connected to the capacitor 40 provided between the bridge circuit 39 and the bridge circuit 45. The control circuit 2 will then:
    determine that AC power is input from the power source 58 to the bidirectional insulated DC/AC inverter 1 when voltage applied to the capacitor 40, after a certain time period from the stop of the AC power output operation of the bidirectional insulated DC/AC inverter 1 (that is, the voltage V2 detected by the voltage detection circuit 6 does not drop to a prescribed voltage),
    inhibit the driving of at least the bridge circuit 51 so as not to output AC power from the bidirectional insulated DC/AC inverter 1, and
    allow the driving of the bridge circuit 45 when charging the battery 52.

Note that the prescribed voltage is the voltage of the capacitor 40 after the voltage drop estimated by a time constant obtained from the capacity of the capacitor 40 and the resistance value of the discharging resistance 7.

What is claimed is:

1. A bidirectional insulated DC/AC inverter, comprising:
    a first power conversion unit, comprising a first AC input/output terminal and a first DC input/output terminal for receiving AC power from the first AC input/output terminal and outputting DC power to the first DC input/output terminal in a power conversion from AC to DC, and for receiving DC power from the first DC input/output terminal and outputting AC power to the first AC input/output terminal in a power conversion from DC to AC;
    a second power conversion unit, comprising a second AC input/output terminal and a second DC input/output terminal connected to the first DC input/output terminal of the first power conversion unit, for receiving AC power from the second AC input/output terminal and outputting DC power to the second DC input/output terminal in a power conversion from AC to DC, and for receiving DC power from the second DC input/output terminal and outputting AC power to the second AC input/output terminal in a power conversion from DC to AC;
    a third power conversion unit, comprising a third AC input/output terminal and a third DC input/output terminal connected to a battery, for receiving AC power from the third AC input/output terminal and outputting DC power to the third DC input/output terminal in a power conversion from AC to DC, and for receiving DC power from the third DC input/output terminal and outputting AC power to the third AC input/output terminal in a power conversion from DC to AC;
    a transformer connected to the second AC input/output terminal of the second power conversion unit and the third AC input/output terminal of the third power conversion unit;
    a control unit for controlling operations of each of the first through the third power conversion units;
    a plug for electrically connecting an external power source and the first AC input/output terminal of the first power conversion unit;
    an outlet, connected to the plug electrically and directly on a steady basis, for electrically connecting an external load and the first AC input/output terminal of the first power conversion unit; and
    a detection unit for detecting first voltage, which is a voltage of the first AC input/output terminal of the first power conversion unit, or second voltage, which is a voltage of the first DC input/output terminal of the first power conversion unit,
    wherein the control unit, based on voltage detected by the detection unit, is configured to determine whether or not AC power is input from the external power source to the first power conversion unit, and to inhibit at least a power conversion operation from DC to AC of the third power conversion unit when it is determined that AC power is input from the external power source to the first power conversion unit thereby preventing the AC power output from the third power conversion unit from being overlapped with the AC power input from the external power source without using a mechanical relay.

2. The bidirectional insulated DC/AC inverter according to claim 1, wherein the control unit comprises an AC power output instruction input unit, and when receiving an AC power output instruction from the bidirectional insulated DC/AC inverter, determines whether or not AC power is input from the power source to the bidirectional insulated DC/AC inverter based on the voltage detected by the detection unit.

3. The bidirectional insulated DC/AC inverter according to claim 1, wherein the control unit, when at least a power conversion operation from DC to AC of the third power conversion unit is stopped, if the first voltage has positive and negative fluctuation at a certain frequency and an amplitude value of the fluctuating voltage is at a prescribed value or higher, determines that AC power is input from the power source to the bidirectional insulated DC/AC inverter, and inhibits at least the power conversion operation from DC to AC of the third power conversion unit.

4. The bidirectional insulated DC/AC inverter according to claim 1, wherein the control unit, when at least a power conversion operation from DC to AC of the third power conversion unit is stopped, if the second voltage is constantly at a prescribed value or higher, determines that AC power is input from the power source to the bidirectional insulated DC/AC inverter, and inhibits at least the power conversion operation from DC to AC of the third power conversion unit.

5. The bidirectional insulated DC/AC inverter according to claim 4, wherein the second voltage is voltage applied to a capacitor, which is provided between the first power conversion unit and the second power conversion unit and to which a discharging resistance is connected, and the control unit, when the second voltage does not drop to a prescribed voltage after a certain time period from the stop of the AC power output operation of the bidirectional insulated DC/AC inverter, determines that AC power is input from the power source to the bidirectional insulated DC/AC inverter, and inhibits at least the power conversion operation from DC to AC of the third power conversion unit.

6. The bidirectional insulated DC/AC inverter according to claim 1, wherein the control unit, when outputting the AC power of the bidirectional insulated DC/AC inverter, if a phase of a waveform of the first voltage is different from a phase of a predetermined voltage waveform, determines that AC power is input from the power source to the bidirectional insulated DC/AC inverter, and inhibits at least the power conversion operation from DC to AC of the third power conversion unit.

7. The bidirectional insulated DC/AC inverter according to claim 6, wherein the control unit changes the phase of the predetermined voltage waveform, when the phase of the waveform of the first voltage is not different from the phase of the predetermined voltage waveform, and determines that AC power is input from the power source to the bidirectional insulated DC/AC inverter and inhibits at least the power conversion operation from DC to AC of the third power conversion unit, when the changed phase of the prescribed voltage waveform is different from the phase of the waveform of the first voltage.

* * * * *